(12) United States Patent
Champaney et al.

(10) Patent No.: US 8,705,495 B2
(45) Date of Patent: Apr. 22, 2014

(54) COMMUNICATION METHOD USING TIME-DIVISION MULTIPLEXING

(75) Inventors: Pascal Champaney, Letouvet (FR); Pascal Saguin, Saint Pierre d'Allevard (FR)

(73) Assignee: Adeunis R F (FR)

( * ) Notice: Subject to any disclaimer, the term of this patent is extended or adjusted under 35 U.S.C. 154(b) by 177 days.

(21) Appl. No.: 13/375,281

(22) PCT Filed: Nov. 13, 2009

(86) PCT No.: PCT/FR2009/052178
§ 371 (c)(1),
(2), (4) Date: Dec. 6, 2011

(87) PCT Pub. No.: WO2010/149864
PCT Pub. Date: Dec. 29, 2010

(65) Prior Publication Data
US 2012/0106520 A1    May 3, 2012

(30) Foreign Application Priority Data
Jun. 23, 2009  (FR) ..................... 09 03040

(51) Int. Cl.
*H04J 3/00* (2006.01)
(52) U.S. Cl.
USPC .......................... 370/336; 370/330
(58) Field of Classification Search
USPC ........................ 370/336, 338, 345
See application file for complete search history.

(56) References Cited

U.S. PATENT DOCUMENTS

| 5,544,075 | A  | * | 8/1996  | Janex .......................... 370/230 |
| 6,567,396 | B1 | * | 5/2003  | Pohjanvouri et al. ......... 370/349 |
| 7,411,977 | B1 | * | 8/2008  | Chen et al. .................... 370/468 |
| 7,877,208 | B1 | * | 1/2011  | Battista ........................ 701/490 |
| 2004/0047319 | A1 | * | 3/2004 | Elg ................................ 370/338 |
| 2004/0196872 | A1 | * | 10/2004 | Nakamura .................... 370/512 |
| 2010/0007311 | A1 | * | 1/2010  | Colin et al. ................... 320/134 |

FOREIGN PATENT DOCUMENTS

| EP | 0635959 A1 | 1/1995 |
| EP | 1843326 A1 | 10/2007 |

OTHER PUBLICATIONS

International Search Report issued Feb. 15, 2010 by European Patent Office re: PCT/FR2009/052178; citing: EP 0 635 959 A1.

* cited by examiner

*Primary Examiner* — Anh-Vu Ly
*Assistant Examiner* — Hashim Bhatti
(74) *Attorney, Agent, or Firm* — Cantor Colburn LLP (57) ABSTRACT

The invention relates to a communication method using time-division multiplexing, which enables permanent communication between user terminals. One of the terminals is a master terminal, while the others are slave terminals. The transmission channel is divided into consecutive cycles, and each cycle is divided into timeslots. Each slave terminal identifies, in a listening mode, a free timeslot in the current cycle (6) and, in a transmission mode, transmits data in the identified timeslot during at least one subsequent cycle (7). As soon as the slave terminal stops transmitting, the identified slot becomes free again.

22 Claims, 8 Drawing Sheets

| TS 1 | TS 2 | TS 3 | TS 4 | TS 5 | TS 6 |
|---|---|---|---|---|---|
| Sync U1 = Master-U | Sync2 U2 | | | | |

FIG.5

| TS 1 | TS 2 | TS 3 | TS 4 | TS 5 | TS 6 |
|---|---|---|---|---|---|
| Sync Master-U | PRIO=1 | PRIO=1 | PRIO=1 | PRIO=1 | PRIO=1 |

FIG.6A

| TS 1 | TS 2 | TS 3 | TS 41 | TS 42 | TS 51 | TS 52 | TS 61 | TS 62 |
|---|---|---|---|---|---|---|---|---|
| Sync Master-U | DATA U1 | DATA U2 | PRIO=2 | PRIO=2 | PRIO=2 | PRIO=2 | PRIO=2 | PRIO=2 |

FIG.6B

| TS 1 | TS 2 | TS 3 | TS 41 | TS 42 | TS 51 | TS 52 | TS 61 | TS 62 | TS 63 |
|---|---|---|---|---|---|---|---|---|---|
| Sync Master-U | DATA U1 | DATA U2 | DATA U3 | DATA U4 | DATA U5 | DATA U6 | PRIO=3 | PRIO=3 | PRIO=3 |

| TS6 | TS1 | TS2 | TS3 | TS4 | TS5 | TS6 | TS1 |
|-----|-----|-----|-----|-----|-----|-----|-----|
|     | Sync + Audio + Φ1 | Φ2 |  | Φ3 | Audio |  |  |

| TS6 | TS1 | TS2 | TS3 | TS4 | TS5 | TS6 | TS1 |
|-----|-----|-----|-----|-----|-----|-----|-----|
|     | Sync + Φ1 + Audio | Φ2 |  | Audio | Order |  |  |

FIG.9B

| TS6 | TS1 | TS2 | TS3 | TS4 | TS5 | TS6 | TS1 |
|-----|-----|-----|-----|-----|-----|-----|-----|
|     | Sync + Φ1 + Audio | Φ2 |  | Audio |  | AR |  |

FIG.9C

| Header | Measurement Φ1 | Measurement Φ2 | Audio | CRC + EOF |
|---|---|---|---|---|
| | XXXX | YYYY | ZZZZZZZZ | |

PQD

COMMUNICATION METHOD USING TIME-DIVISION MULTIPLEXING

TECHNICAL FIELD

The invention relates to a communication method using time-division multiplexing between a master terminal and several slave terminals, a data transmission being done in successive cycles, each cycle being divided into a plurality of timeslots, one timeslot of each cycle being reserved for the master terminal to transmit a synchronization signal, and each terminal being either in transmission mode or listening mode, during each timeslot.

BRIEF DISCUSSION OF RELATED ART

It is understood, within the meaning of the present invention, that a "cycle" consists of a cycle of a communication or transmission channel, said "cycle" sometimes wrongly being called a "frame."

Radio frequencies being more and more requested, solutions for increasing the density of communications are being considered. Time division multiple access communication methods are commonly used, in particular for mobile telephones. Time division multiple access (TDMA) is a time-division multiplexing method making it possible to transmit several digital signals on a same frequency channel. In this way, several users share the same channel. The data flow is generally divided into data bursts and transmitted in a communication channel divided into successive periodic cycles. Each cycle is divided into several timeslots. The users transmit data successively using their own timeslot within each cycle so that each user has a dedicated timeslot.

Figure 1:
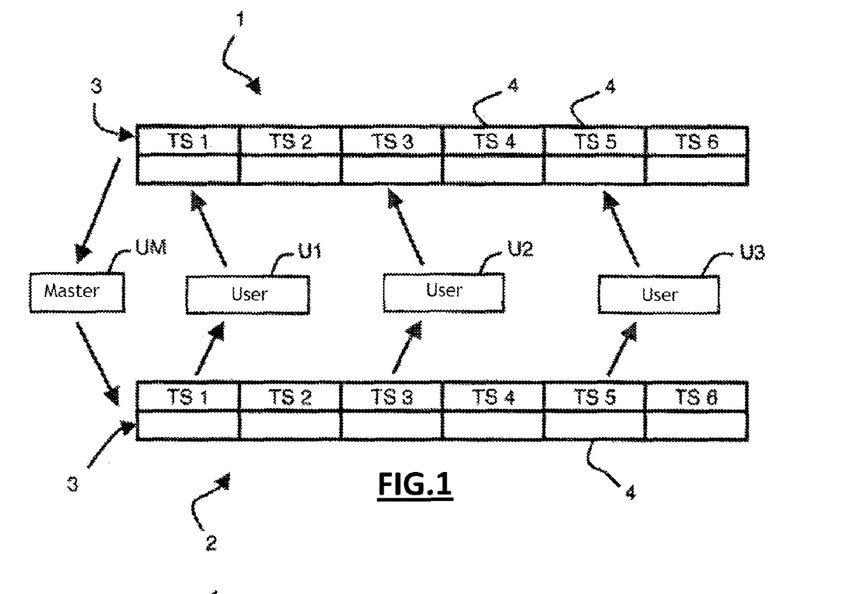
FIG. 1 diagrammatically illustrates a communication method according to the prior art, FIG. 2 diagrammatically illustrates another communication method according to the prior art.

FIG. 1 illustrates an example of TDMA time sharing between various users, here three: U1, U2 and U3. Each timeslot is assigned to a user by master equipment UM, for example a base station, at the end of a negotiation done on a service channel (not shown). All communications pass through this master equipment. This technology generally uses two frequency bands, one for the uplink 1, i.e. to transmit the data from users to the master, and the other for the downlink 2, from the master to the users. Each link includes a series of cycles 3 each divided into several timeslots 4. For example, in FIG. 1, the cycle 3 is divided into six timeslots 4. This TDMA technology is used, for example, in mobile telephones by the GSM/GPRS/EDGE standard or the TETRA standard (Trans European Trunked Radio), or in mobile communication using short- or mid-range radio waves by the PMR (Private Mobile Radiocommunications) or DMR (Digital Mobile Radiocommunications) standards.

Patent application EP1843326 describes a wireless audio, multi-user communication system, with time-division multiplexing in a single channel. In this system, the communication by radio link between all of the users is permanent and the users for example communicate in audio conference mode or in data transmission mode via requests and acknowledgements.

Figure 2:
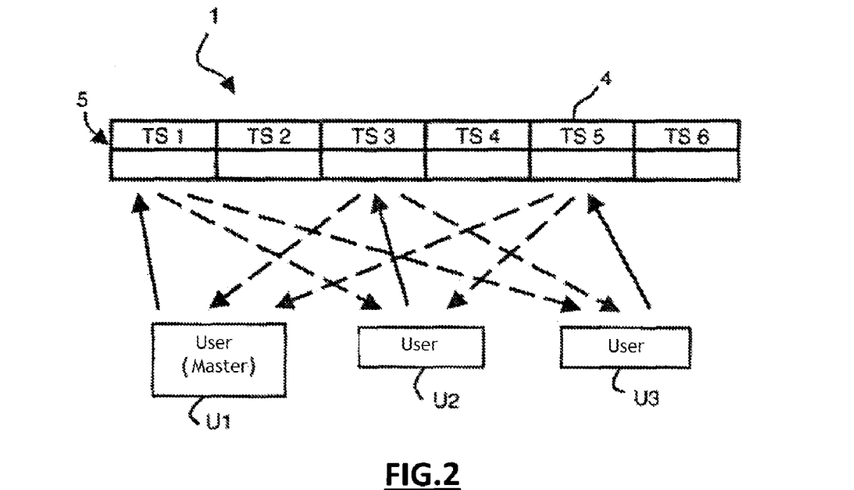

FIG. 2 illustrates the communication method implemented in this patent application. All of the users (U1 to U3), equipped with respective terminals, can communicate with one another and each hears the others' exchanges. The method uses a single frequency band 5. Each terminal has an associated timeslot, in which the terminal transmits. The terminal is in reception mode on the other timeslots. For example, while the terminal of user U1 is transmitting in its timeslot TS1, it is listened to by the other two. Next, it successively listens to the terminal of user U2 during timeslot TS3, then U3 during timeslot TS5.

One of the terminals (U1 in FIG. 2) performs the master function to synchronize the other terminals, which become slaves, and to that end occupies its own time interval with a synchronization signal.

This system makes it possible to obtain conference-type conversations on a single transmission channel 5. Furthermore, this communication system is not dependent on the proper operation of the master. In fact, the latter being any user terminal whatsoever, it can be replaced by another terminal in case of failure.

Nevertheless, this system is limited by the number of possible users due to the limited number of timeslots 4, each timeslot being dedicated to a terminal.

Regarding the safety and monitoring of people in isolated or hostile environments, such as loggers in the forest, for example, or firefighters working on a fire or workers working along a railway or a stream of water downstream from a dam, it is known to use remotely controlled systems taking on more or less sophisticated sensors and wireless communication means, such as PMR or DMR standard local radiocommunications mobiles or modem elements or GPRS or TETRA standard mobile telephones within a network infrastructure, to be able to escalate an alarm signal or warning, point to point, toward a local monitoring or a remote intervention station. However, the model or mobile telephone elements using standard GPRS or TETRA have many drawbacks, the primary one of which lies in the chronic or permanent unavailability of the communication network in certain geographical areas, such as isolated areas (forest, alongside a stream of water or railroad tracks) or urban areas regularly subjected to network saturation. For safety and monitoring applications for people in isolated or hostile environments where a person's life may be at stake, it is crucial for the network availability to be faultless so as to prevent an isolated worker in a dangerous situation from not being able to communicate with the local monitoring or the remote intervention station.

BRIEF SUMMARY

The invention relates to a simple and easy-to-use communication method making it possible to put a large number of any terminals in communication. Particular embodiments of the invention aim to increase the network availability.

One of the aims of the method according to the invention is to offer an audio-digital communication solution (with audio-digital data or voice data) capable of ensuring both service communications (voice exchanges such as order transmission and/or information escalation) and monitoring of the operating conditions of users holding terminals.

Another aim of the present invention is to offer a communication method dedicated to multiple communications in a single transmission channel and that is not based on any infrastructure or any network, so as always to be available, irrespective of the location of the terminals, in particular to allow proximity of the users with prevention or intervention means. In this way, any anomaly or danger for a user may be escalated to nearby users who are part of the immediate and local surroundings of that user in danger. The intervention will be all the faster inasmuch as the alarm is local and broadcast to a large number of people, which advantageously makes the method according to the invention possible.

The invention relates to a communication method using time-division multiplexing between a master terminal and several slave terminals, a data transmission being done in successive cycles of a communication channel, each cycle being divided into a plurality of timeslots, one timeslot of each cycle being reserved for the master terminal to emit a synchronization signal, and each terminal either being in transmission mode or in listening mode, during each time interval, this method being remarkable in that, in listening mode, each slave terminal selects a free timeslot in the current cycle, and in transmission mode, emits, during at least one subsequent cycle, data in the selected timeslot, said selected slot becoming free as soon as the slave terminal stops transmitting.

Each terminal therefore carries out the following steps:

listening to the other terminals to know the occupation of the timeslots in the current cycles;

identification, in listening mode, of a free timeslot of a cycle of the channel;

transmission, in transmission mode, of data in the timeslot identified during at least one subsequent cycle.

Thus, this method makes it possible for each slave terminal that needs to transmit to act "opportunistically" by reserving itself the first available slot it sees. This method therefore allows a limited subset of a large number of users to intervene in the communication, so that the number of terminals can be larger than that of the timeslots in a cycle, provided that the number of terminals transmitting at the same time remains below or equal to the number of timeslots.

According to one embodiment, each slave terminal assigns priority levels to the different free timeslots in the cycle, only selects a timeslot for transmission if the priority level of the slot is low enough, and assigns variable priority levels as a function of the number of free timeslots.

In this embodiment, the method advantageously makes it possible to allocate timeslots to the high-priority data, terminals or users, thereby making it possible to ensure priority for so-called high-priority data, such as audio-digital data transmitted by a high-priority user, for example instructions or voice orders transmitted by a manger or team leader, or alarm data, such as for example measurement data indicating that a parameter (temperature, concentration of a gas, radioactivity level, heart rate, etc.) has gone above or below a predefined threshold.

According to one feature, the priority level of the free timeslots increases as the number of free timeslots decreases, thereby making it possible to guarantee the availability of a timeslot, when the channel is very requested, for a high- or maximum-priority terminal.

According to another feature, a minimum-priority terminal forcibly frees, at its own initiative, the timeslot it occupies when the channel is saturated, so that the newly free timeslot will be available quickly, when the channel is very stressed, to a high- or maximum-priority terminal.

In one particular embodiment, the method includes a step for reserving a timeslot for a high-priority user terminal throughout the entire communication, thereby constantly guaranteeing the availability of that timeslot for that terminal irrespective of the saturation level of the channel.

According to one possibility of the invention, the master terminal is a high-priority user terminal.

According to another possibility according to the invention, each slave terminal of a high-priority user transmits, in the timeslot reserved for it, a synchronization signal different from that of the master, thereby making it possible to signal to the other terminals that the timeslot is unavailable, even if it does not contain data.

Advantageously, the method includes a step for dividing each free timeslot into sub-slots, each sub-slot being available for a different terminal. Thus, when the channel is very requested, this step makes it possible to allocate subtimeslots, which are of course reduced relative to the initial slots, but sufficient to maintain the transmission of certain data.

This number of sub-slots per slot can increase when the number of free timeslots decreases, so as to adapt to a potential increase in the requests for the channel.

In one particular embodiment, the master terminal and all or some of the slave terminals are audio-digital communication terminals adapted for the transmission/reception of audio-digital data, the data exchanged between the terminals comprising this audio-digital data.

This method is particularly well-suited to conferences or exchanges of audio-digital data within a hierarchical group with one or more order-givers or active speakers communicating information or orders, and performers or passive speakers essentially listening to the information or orders and thus rarely using the channel to transmit audio-digital data.

In one improved embodiment, the slave terminals comprise one or more terminals for detecting a parameter, in particular of the physical, chemical, environmental, physiological or status type, the or each detection terminal comprising at least one sensor for measuring a parameter and means for transmitting measurement data taken by the corresponding sensor, the data exchanged between the terminals comprising that measurement data.

A detection function can for example be associated with an audio-digital communication terminal within a device onboard a user; this device comprising one or more sensors and radiocommunication means. Alternatively, a detection terminal can be isolated from the users, for example being fixed to a strategic location for taking measurements or fixed on a mobile device or robot.

Thus, the audio-digital communication terminals (master and slave) are adapted to receive this measurement data, in addition to the audio-digital data, thereby allowing a user to know the evolution of the parameter(s) in question and, possibly, that a critical threshold has been exceeded characterizing a danger or alarm situation.

The method can thus include a step for assigning priority levels according to categories of data, i.e. the audio-digital data category and the measurement data category, thereby making it possible as a priority to allocate a timeslot to a particular category of data, when the channel is very requested.

The detection terminal(s) can transmit an alarm measurement datum when the associated parameter exceeds a predefined critical threshold (minimum threshold or maximum threshold), so as to alert users of a critical situation. In that case, all or some of the audio-digital communication terminals transmit an alarm signal after receiving the alarm measurement datum; this general alarm signal, intended for all or some of the users, can be acoustic and/or visual.

The detection terminal(s) can transmit the measurement data constantly or at regular intervals, thereby making it possible to monitor the evolution of that parameter over time. Alternatively, the detection terminal(s) can transmit only the alarm measurement datum when a threshold is crossed, thereby avoiding cluttering the channel with so-called service measurement data when the situation is normal, i.e. when the parameters have not crossed the predefined critical thresholds.

Preferably, the method includes a step for assigning a higher priority level for the alarm measurement data than the priority level for the audio-digital data, this alarm measurement datum constituting a critical measurement datum as described above.

Furthermore, the method can include a step for assigning a priority level for the service measurement data below the priority level for the alarm measurement datum.

It is also possible to consider that the detection terminal(s) transmit(s) measurement data at regular time intervals, and that each audio-digital communication terminal analyzes the measurement data relative to an alert threshold specific to it so as to transmit an alarm signal if the measurement data exceed that alert threshold.

Thus, the transmission of the alarm signal is specific to each user, and no longer general as in the case previously described, because each user can have a different critical tolerance threshold relative to the other users. For example, depending on whether the user is wearing a suit protecting from radiation, the alert threshold for measurement data measuring the surrounding radiation will be different. As before, this alarm signal specific to each user can be acoustic and/or visual.

In one particular embodiment, the slave terminals comprise one or more control terminals, also called actuators, of a functional member provided with means for receiving data transmitted by the other terminals, so that the method comprises a step for transmitting an order datum and a step for actuating the functional member after reception of the order datum by the control terminal.

In this way, this method enables communication between the audio-digital communication terminals and/or the detection terminals, so that the audio-digital communication terminals and/or the detection terminals can send an order datum to the control terminal to actuate the functional member.

It is therefore possible to consider that the order datum is transmitted by an audio-digital communication terminal; this order datum being transmitted directly, or even manually, by a user wishing to actuate the functional member in question. As described below, the order datum transmitted by an audio-digital communication terminal can be transmitted to the control terminal either directly or via one or more audio-digital communication terminals that propagate the order datum in question.

Alternatively, the order datum is transmitted by a detection terminal when the associated parameter exceeds a predefined critical threshold; this order datum being transmitted automatically by the detection terminal, without user intervention, to actuate the functional member in question. As described below, the order datum transmitted by the detection terminal can be transmitted to the control terminal either directly, or via one or more audio-digital communication terminals that propagate the order datum in question.

Preferably, the method also comprises a step for transmitting a reception datum via the control terminal so as to acknowledge receipt of the order datum, and potentially to indicate the actuation or non-actuation of the functional member.

In this way, the method makes it possible to confirm the proper receipt of the order datum and inform users of the proper actuation of the functional member, or even the failure of the functional member; such a step being clearly advantageous for safety or alert applications.

Preferably, the method includes a step for assigning priority levels as a function of the data categories, i.e. the audio-digital data category, the measurement data category and the order data category.

According to one feature, the method includes a step for assigning a priority level for the alarm measurement datum higher than the priority level for the order datum, so as to favor the alarm measurement datum in the assignment of the timeslots.

According to another feature, the method includes a step for assigning a priority level for the order datum higher than the priority level for the audio-digital data, so as to favor the order datum relative to the audio-digital data in the assignment of the timeslots.

According to another advantageous embodiment, all or some of the audio-digital communication terminals relay the received data to the other terminals so as to propagate that data. In this way, it is possible to propagate a datum over significant distances, the audio-digital terminals used to that end repeating or retransmitting the received data without necessarily interpreting it.

BRIEF DESCRIPTION OF THE DRAWINGS

Other advantages and features will emerge more clearly from the following description of particular embodiments of the invention provided as non-limiting examples and shown in the appended drawings, in which.

DETAILED DESCRIPTION

FIGS. 3A to 3D show steps, in one example, of a first embodiment of a communication method according to the invention. This method has similarities with that described relative to FIG. 2. The novelty lies in the fact that the timeslots of the cycles are not reserved for respective terminals and the number of terminals, or communication nodes, may be larger than the number of slots in a cycle.

Figure 3A:
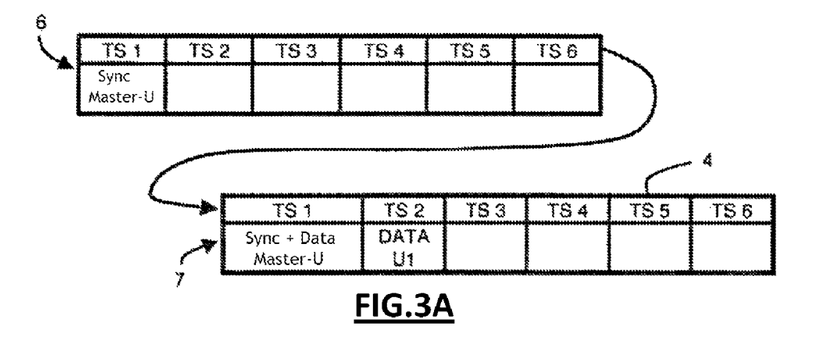
FIGS. 3A to 3D illustrate several steps as an example of a first embodiment of the communication method according to the invention, respectively showing two successive cycles of the communication channel.

FIG. 3A shows two successive cycles of a communication. The current cycle 6 is empty of data, aside from the synchronization signal Sync of the master terminal Master-U. In the examples described here, the first timeslot TS1 is reserved for the master terminal, in which the latter continuously transmits at least the synchronization signal Sync. The first function of a master terminal is to ensure the synchronization, i.e. to indicate the boundaries of each cycle to the slave terminals. Any terminal can act as the master and use any timeslot as long as it is alone in that role at a given moment.

The timeslots TS2 to TS6 are free from data in the current cycle, i.e. no slave terminal is transmitting in one of those slots. Each slave terminal listening to the other terminals, it knows the occupation of the timeslots 4 in the current cycle 6. It can therefore identify, in listening mode, a free timeslot and, in transmission mode, transmit data in the timeslot identified during at least the following cycle 7. Thus, in the example of FIG. 3A, the timeslot TS2 of the current cycle 6 was identified as free by the terminal of user U1, and the latter can therefore transmit its data DATA in that timeslot during the following cycle 7. As long as there is data to transmit, the terminal keeps the slot TS2 and transmits subsequent data bursts in the same timeslot (not shown). If the master terminal master-U intervenes in the communication and has data to transmit, it transmits its data DATA in its own timeslot (TS1), in addition to the synchronization signal Sync, as shown in the following cycle 7; this data being able to be grouped together in a same data burst.

If, during a same cycle, several terminals identify the same free timeslot, it is possible that they may collide in simultaneously transmitting in that timeslot. The analog signals overlapping in the timeslot, only the strongest signal will be received. This collision is managed using a normal transmission protocol, such as the handshake protocol.

For example, in data transmission, the transmission is intended for one of the terminals, which sends back a return receipt. In this way, the colliding terminal whose transmission was not received will not receive the return receipt sent to it and will retransmit its data in another free timeslot of a subsequent cycle.

For example, it is possible to provide that the master terminal master-U ensures the acknowledgement of transmission from the slave terminals. In this way, the colliding terminal that did not receive a return receipt from the master terminal proceeds to identify a new free slot to continue to transmit.

Figure 3B:
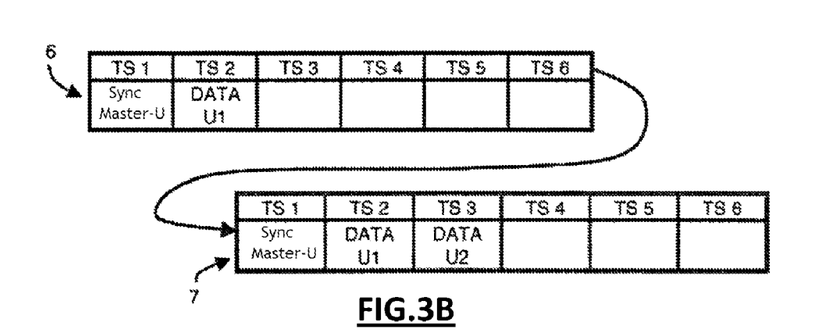

In FIG. 3B, a second user U2 takes the following free slot TS3 to transmit. Thus, two timeslots (TS2 and TS3) are occupied by the terminals of users U1 and U2.

Figure 3C:
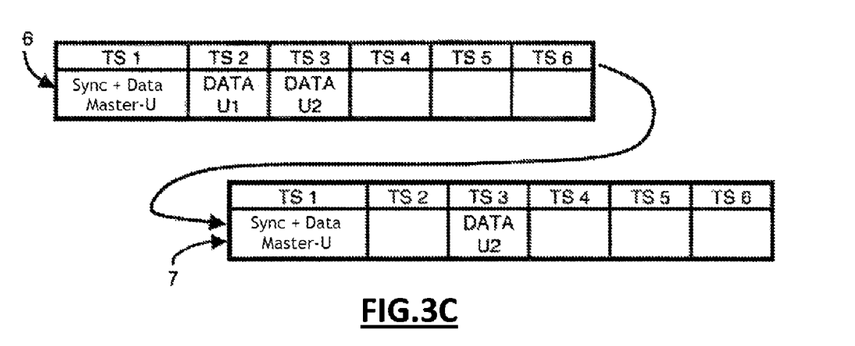

In FIG. 3C, the terminal of user U1 no longer has data DATA to transmit. The timeslot it occupies in the current cycle 6 becomes free again in the following cycle 7.

Figure 3D:
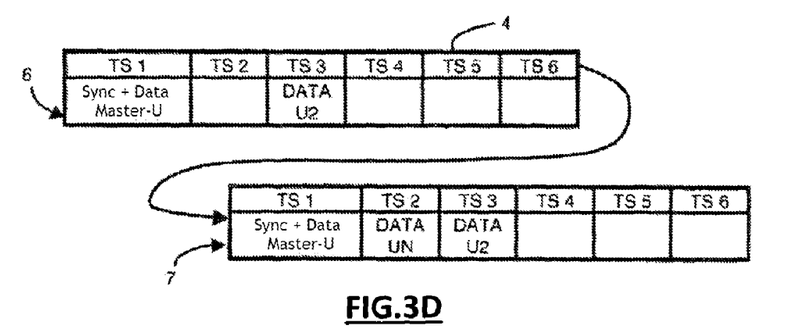

In FIG. 3D, if a new slave terminal UN has data to transmit, it identifies the timeslot TS2 freed in the current cycle 6 during a listening phase and transmits its data DATA in the timeslot TS2 of the following cycle(s) 7.

In many applications such as audio conferences or data exchanges through requests and acknowledgements, the number of users can be high. The number of terminals, however, or communication nodes that simultaneously transmit data is generally small relative to the number of terminals that listen. A person cannot concentrate on several simultaneous conversations; likewise, a network concentrator cannot receive data from several peripherals at the same time.

Thus, each slave terminal that needs to transmit acts "opportunistically" by reserving itself the first available slot it sees. The method described above allows a limited subset of a large number of users to intervene in the communication. In this way, the number of terminals can be higher than that of the time intervals in a cycle, provided that the number of terminals transmitting at the same time remains below or equal to the number of timeslots.

Figure 4A:
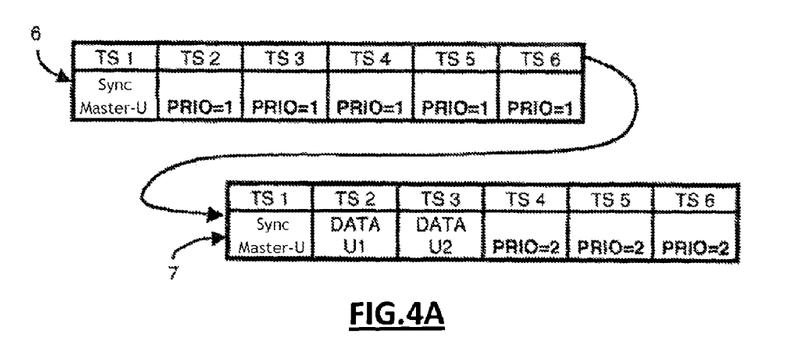
FIGS. 4A and 4B show the steps of a second embodiment of the method according to the invention, respectively showing two successive cycles of the communication channel.
Figure 4B:
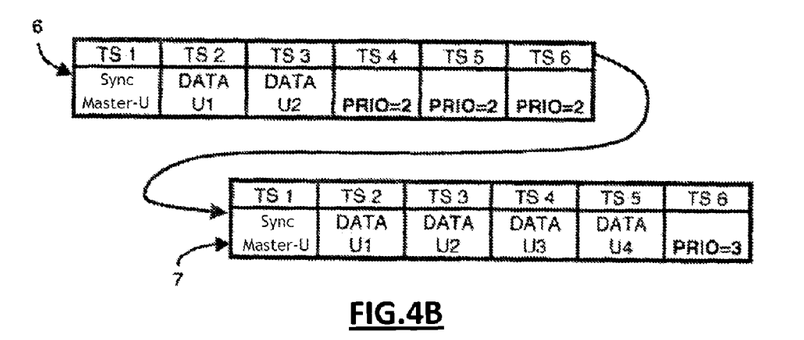

FIGS. 4A and 4B show steps of a second embodiment of the communication method in the context of an example. As the terminals have data to transmit, the availability of the timeslots decreases. However, it is possible for one of the slave terminals, urgently needing to transmit data, to find itself faced with a saturated or unavailable channel.

In this embodiment, the method includes a mechanism that makes it possible to ensure the availability of the transmission channel for data deemed high-priority and thereby to hierarchize access to the channel.

Each slave terminal, continuously knowing the number of free timeslots, itself determines a priority level for those slots, for example using an algorithm implemented in each terminal. Furthermore, a priority level is assigned to each terminal, for example fixedly, programmed before it is used. Thus, a terminal only assigns itself a timeslot if its priority level is higher than or equal to the priority level it has determined for the slot.

When all of the timeslots are free, they have a minimum priority level. In the example of FIG. 4A, this minimum priority level is set at 1 (PRIO=1) for each free timeslot in the current cycle 6. Then, the terminals with priority 1 or higher can assign themselves any one of the free timeslots. If, in the following cycle 7, the number of free timeslots decreases, the priority level of those free slots increases (PRIO=2). Then, only the terminals with priority 2 or higher may assign themselves those slots.

In the example of FIG. 4B, the channel is very requested, and only one free timeslot remains for example. Its priority level is set at the maximum to ensure the availability of the slot for a maximum-priority terminal, for example priority 3.

Instead of assigning priorities to the terminals, it is possible to assign priorities to the categories of data that each terminal can transmit. It is possible to consider that, aside from voice, a terminal can transmit signals, for example an alarm signal that would then have maximum priority.

It is also possible to provide for forcibly freeing a slot used by a minimum-priority terminal. The newly freed timeslot will cause a new calculation of the priority levels of the free slots and the availability of the channel for terminals with a sufficient priority.

For example, a low-priority terminal, knowing at all times the availability of the timeslots, can at its own initiative free the timeslot it occupies if the channel is saturated.

In certain applications, for example on a construction site, one of the users can have an important role, for example the construction superintendent, and must therefore have absolute priority over the others in the communication. Such a user will receive the master terminal, since a timeslot is reserved for it in each cycle to transmit the synchronization to the other terminals. It is nevertheless possible to consider a second user also having high priority.

Figure 5:
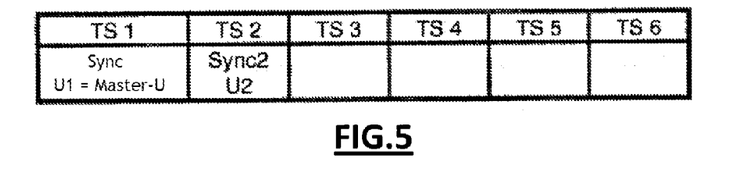
FIG. 5 illustrates a step of an alternative embodiment of the method according to FIGS. 3A to 3D, showing a cycle of the communication channel.

FIG. 5 illustrates a possibility for providing for this scenario. Each high-priority user terminal has a timeslot reserved for it. For example, users U1 and U2 are deemed high-priority. The terminal of U1 is the master terminal. The terminal of U2 definitively assigns itself the timeslot, T2 for example. Only four free timeslots then remain, i.e. TS3 to TS6.

To indicate that a user is high priority, that user's terminal transmits a synchronization signal Sync2 different from that of the master in the reserved timeslot TS2 of each cycle, as shown in FIG. 5. This signal indicates to the other terminals that the slot is unavailable, even if it does not contain data.

This mechanism is compatible with the management of access priorities described above. The terminals that share the remaining slots will determine the priorities of those slots as explained relative to FIGS. 4A and 4B.

In order to further improve the availability of the channel, the method can include a step for dividing the free timeslots into sub-slots. The timeslots are therefore shortened so as to increase the number of them. The volume of data of the sub-slots is therefore reduced, but a larger number of terminals may potentially transmit in a same cycle.

Figure 6A:
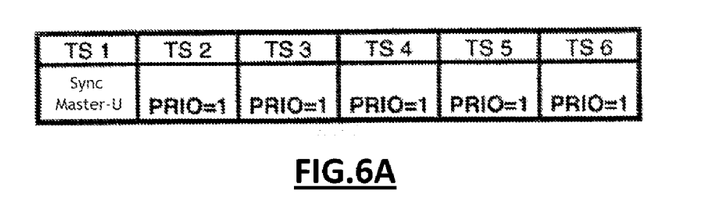
FIGS. 6A to 6C show the steps of another embodiment of the method according to the invention, respectively showing a cycle of the communication channel, FIG. 7 diagrammatically illustrates an audio-digital communication terminal adapted to carry out the method according to the invention, FIG. 8A diagrammatically illustrates a communication network comprising audio-digital communication terminals and detection terminals, for implementing a third embodiment of the communication method according to the invention, respectively showing a cycle of the communication channel.

In the example of FIG. 6A, the cycle initially includes six timeslots. The first, TS1, is reserved for the master terminal, which can be a terminal belonging to a high-priority user. The slots TS2 to TS6 are associated with the secondary users. Given that, in FIG. 6A, the timeslots TS2 to TS6 are all free, the priority level of those timeslots is minimum.

Figure 6B:
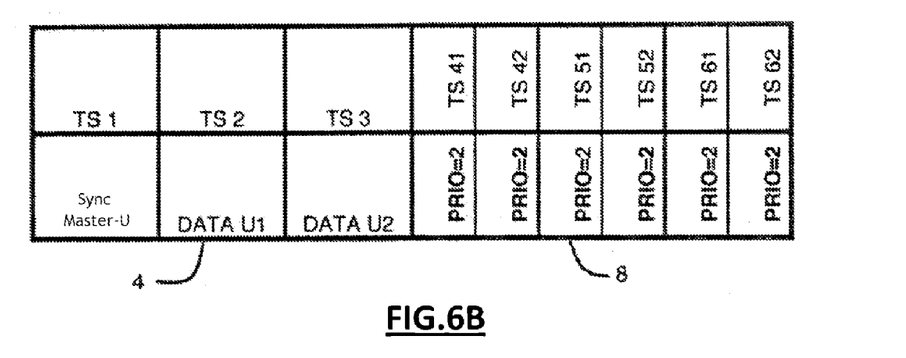

In FIG. 6B, the timeslots TS2 to TS3 are occupied by secondary users U1 and U2. The number of free slots decreases and therefore the priority level of those slots increases. Furthermore, these same timeslots 4 are each divided into two sub-timeslots 8. For example, the slot TS4, with priority 2, is divided into two sub-slots TS41 and TS42, also with priority 2.

Figure 6C:
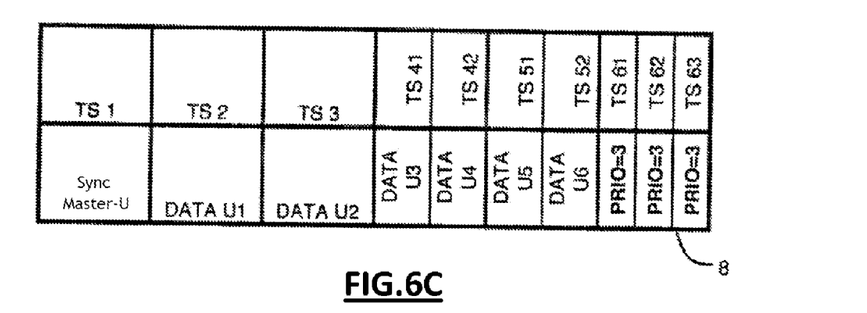

If the channel becomes very requested, i.e. if, for example, only a single free timeslot remains, the latter can be divided into three sub-slots TS61, TS62 and TS63 with a maximum priority level, as illustrated in FIG. 6C.

The division of the timeslots and the priority levels are determined by a same algorithm implemented in each terminal, for example at the protocol layers for conveying the data.

Many alternatives and modifications of the method described here will appear to one skilled in the art. The system has been described relative to wireless terminals intended for voice transmission. It is not out of the question to use these principles in a network, wired or not, to process a data transmission between communication points. The term "terminal" will therefore be understood in this patent application as describing both a piece of equipment that interacts with the user during an audio communication and a communication point of an independent data exchange network.

Figure 7:
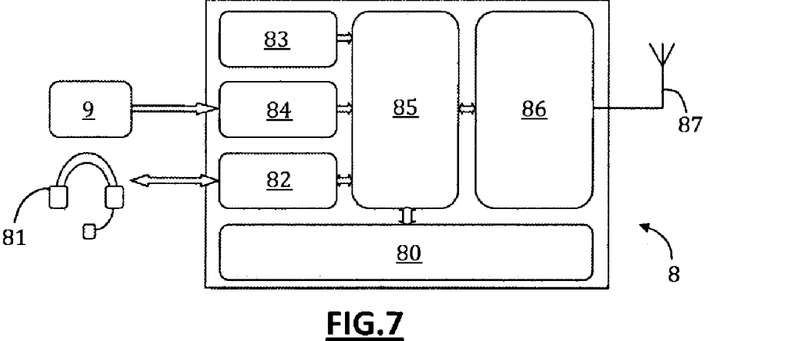

FIG. 7 shows an audio-digital communication terminal 8 adapted to implement a method according to the invention, this audio-digital communication terminal 8 being adapted to receive and transmit audio-digital data "Audio" (or voice data) during an audio communication, in the timeslots of cycles 6, 7, as described above.

This audio-digital communication terminal 8 includes:
a man-machine interface 80 (MMI), in particular allowing the user to transmit orders or order data, as described later, such a man-machine interface 80 for example being made in the form of a keyboard, numeric keypad, touchscreen or similar device;
an audio communication system 81 making it possible to receive and transmit the voice, traditionally comprising a microphone and a speaker, such an audio communication system 81 being able to be made in the form of a communication helmet or an earpiece of the mobile telephone type;
an audio-digital interface 82, connected with the audio communication system 81, in order to convert the voice into audiometric data "Audio" and vice versa;
potentially one or more onboard sensors 83 designed to measure a local parameter, such as for example an accelerometer or a temperature sensor, and convert it into a measurement datum "φ";
potentially an acquisition interface 84 connected with one or more external detection terminals 9 designed to measure an external parameter, such as a Geiger counter or a gas measurement probe, for example, and to convert it into a measurement datum "φ";
a communication processor 85, connected with the communication system and, if applicable, with the onboard sensor(s) 83 and the acquisition interface 84, designed to receive as input the various audiometric "Audio" and measurement "φ" data and to deliver them as output in the timeslots of the communication cycles 6, 7 according to the method described above, and vice versa; and
a digital radio motor 86, connected with the communication processor 85, for transmitting and receiving the data, via an antenna 87.

With this radio-digital communication terminal 8, all of the measurement data "φ" can be transmitted systematically in the timeslots allocated according to the method described above; the timeslots potentially being completed by audio-digital data "Audio" or order data "Order" if the user enters a conversation or takes an action.

Figure 8A:
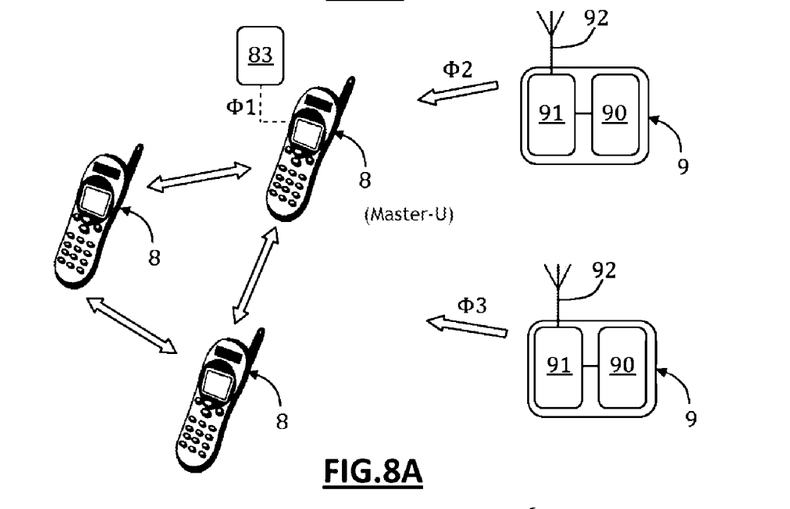

FIG. 8A shows a communication network comprising audio-digital communication terminals 8 and external detection terminals 9 implementing a third embodiment of the communication method according to the invention.

In this FIG. 8A, the network comprises:
three audio-digital communication terminals 8 associated with respective users and transmitting/receiving audio-digital data "Audio" and measurement data, where one of the audio-digital communication terminals 8 integrates an onboard sensor 83 and is therefore able to transmit a first measurement datum φ1.
two external detection terminals 9 respectively transmitting a second measurement datum φ2 and a third measurement datum φ3.

The detection terminals 9 respectively include:
a sensor 90 for measuring a parameter, in particular such as a physical, chemical, environmental, physiological or status parameter;
a means 91 for transmitting measurement data "φ" coming from the measurement sensor 90, this transmission means 91 being designed to receive as input the data coming from the measurement sensor 90 and deliver, as output, that data in the timeslots of cycles 6, 7 according to the method described above, via an antenna 92.

During normal usage, the bulk of the radio-digital communications between the audio-digital communication terminals 8 comprises voice exchanges, or audio-digital data exchanges "Audio," based on the method as described above; these exchanges being intended for normal service usage.

Given that the communications are digital, the audio-digital data "Audio" can be completed by measurement data "φ" related to analyses or physical measurements of the user's environment, such as, for example:
measurements of the local temperature, the toxicity of the air or the presence of gas, in particular for a working firefighter;
measurements of physiological signals, in particular for security personnel, a combatant or a patient free to move within a hospital structure;
life constant detection (deadman detector), in particular for an isolated worker;

measurement of the acceleration, by an accelerometer, to detect a fall of a person, in particular for workers working at heights, on a scaffolding, on an elevator, or suspended from ropes;

measurement of the status of an on-off sensor, in particular of the closed/open switch type, voltage presence type, etc.

measurement of radioactivity, with a Geiger counter fixed or mounted on a mobile robot that precedes an intervention team in a nuclear setting so that each element of the team can be alerted immediately in case of danger in the progression;

detection of the management of a hydraulic dam and/or the water level, in particular to alert a hauling team located on the edge of a stream of water in case of sudden increase due to releasing the dam;

detection of the passage of a vehicle and in particular a train to simultaneously alert all railway maintenance agents of the imminent arrival of a train.

The insertion of this measurement data "φ" into the cycles, as a supplement to the audio-digital data "Audio," can be considered because the network and the cycles are generally not very stressed with audio-digital data "Audio," in particular within a hierarchized group with one or more order givers or active speakers communicating information or orders, and performers or passive speakers essentially listening to the information or orders and therefore rarely using the channel to transmit audio-digital data. The same is true for the insertion of order data "order" described below.

Figure 10:
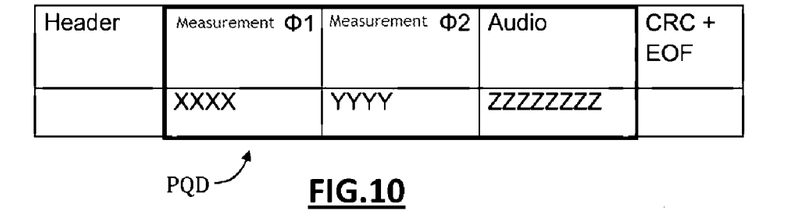

As illustrated in FIG. 10, the transmission time for each user is therefore split between audio-digital data "Audio" and measurement data "φ", in this case a first measurement datum φ1 and a second measurement datum φ2, united within a data burst PQD united in a mixed data frame. The nature of the header of the data burst PQD can for example determine the format and content of the burst (number of measurement data, presence or absence of audio-digital data, order data, size of the bursts, etc.), before closing the burst with a postamble or trailer "CRC+EOF."

Figure 8B:
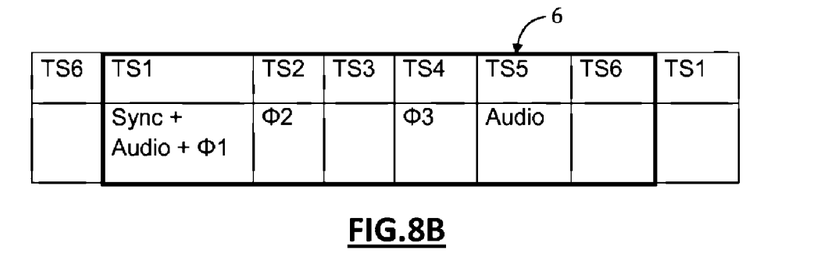
FIGS. 8B to 8D show three alternatives of a step of the third embodiment of the communication method according to the invention, FIG. 9A diagrammatically illustrates a communication network comprising audio-digital communication terminals, detection terminals and control terminals of a functional member, for implementing a fourth embodiment of the communication method according to the invention.
Figure 8C:
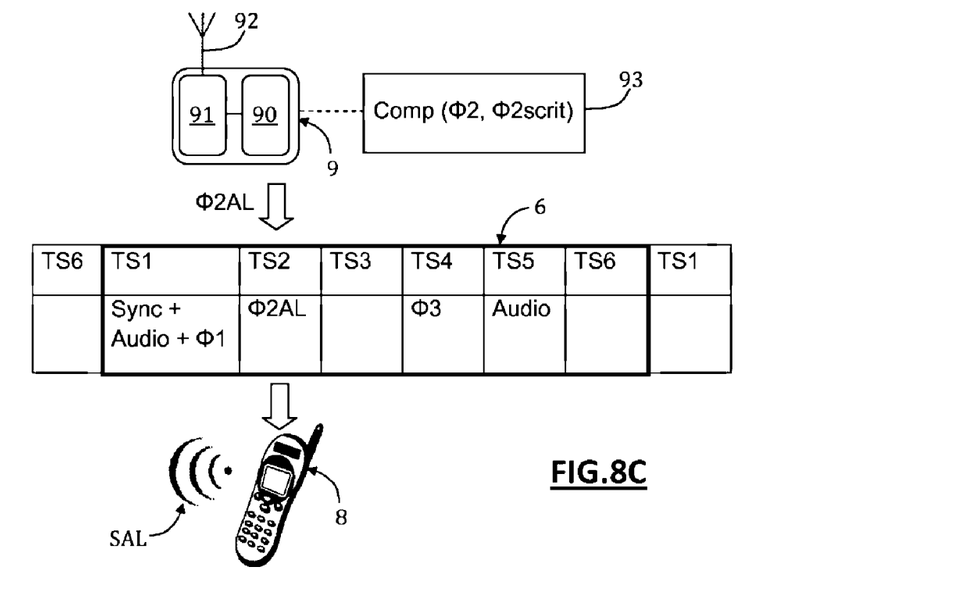
Figure 8D:
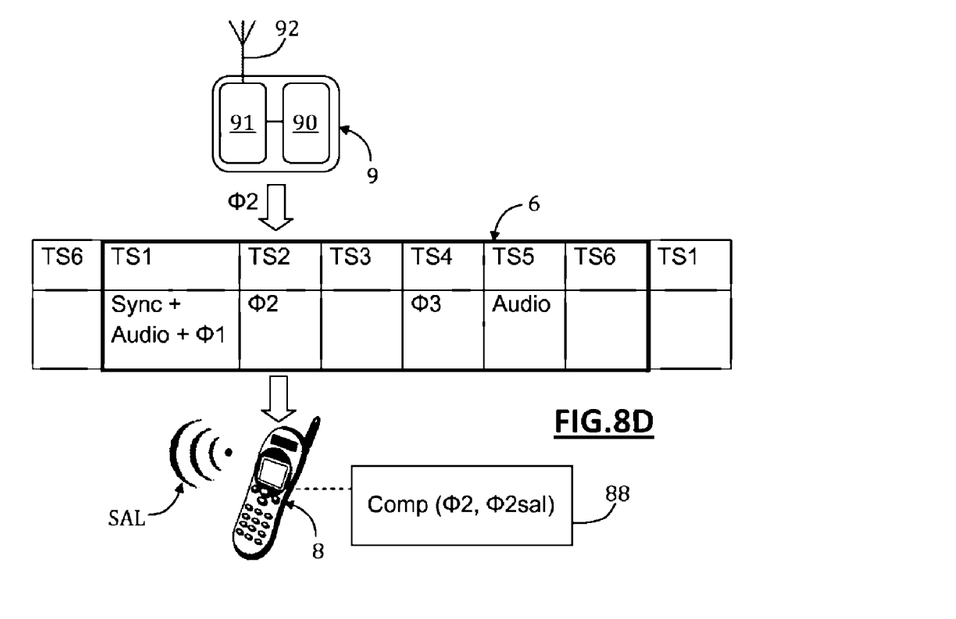

FIGS. 8B to 8D show three alternatives of a step of the third embodiment of a communication method according to the invention, in which the measurement data "φ" are transmitted in a cycle 6 as a supplement to audio-digital data "Audio"; this third method is applicable for a network of the type illustrated in FIG. 8A.

On the same principle as the embodiments described above, this third embodiment of the method comprises that all of the terminals 8, 9 listen to one another within a local network, each terminal knowing the instantaneous status of its neighbors to select a free timeslot, with the preferential establishment of the different priority protocols described above.

It is thus possible to consider that one of the audio-digital communication terminals 8 receives a datum characteristic of an alert or a danger (anomaly in a colleague, parameter exceeding a predefined security threshold, etc.), and alerts its user so as to indicate that alert or danger to him to implement a fast and precise safety or rescue measure (withdrawal order, emergency call, safety instructions, etc.).

In reference to FIGS. 8A and 8B, a first alternative of the step of the third embodiment comprises:

an audio-digital communication terminal 8, here forming the master terminal master-U and provided with an integrated sensor 83, communicates audio-digital data "Audio," a first measurement datum φ1 and the synchronization signal Sync in the timeslot TS1 of cycle 6;

a first detection terminal 9 communicates a second measurement datum φ2 in the timeslot TS2;

a second detection terminal 9 communicates a third measurement datum φ3 in the timeslot TS4;

one of the other two audio-digital communication terminals 8 communicates audio-digital data "Audio" in the timeslot TS5.

In this way, all of the users know, at any moment, the parameters measured by the sensors of the local network or the measurement data. Each user is therefore able to interpret those measurements in order to modify his behavior, if necessary. The detection terminals 9 and the other two audio-digital communication terminals 8 form slave terminals.

The measurement data can nevertheless be supervised by the users as event or anomaly detectors that can give rise to alarms, which is the subject-matter of the two following alternatives.

In reference to FIGS. 8A and 8C, a second alternative of the step of the third embodiment comprises:

the second detection terminal 9 transmits an alarm measurement datum φ 2AL when the associated measurement datum φ2 exceeds a predefined critical threshold φ2scrit, and the audio-digital communication terminal(s) 8 transmit an alarm signal SAL following reception of the alarm measurement datum φ2AL.

In other words, in this second alternative, the parameter measured by at least one of the internal 83 and/or external 90 sensors is analyzed locally relative to a predetermined threshold, and it is an alarm measurement datum φ2AL that is generally broadcast to all of the audio-digital communication terminals 8 of the network, and therefore to all users without distinction.

To that end, and as shown in FIG. 8C, the corresponding detection terminal 9 includes a comparison block 93 between the measurement data φ2 and the predefined critical threshold φ2scrit. Furthermore, each audio-digital communication terminal 8 includes means for transmitting the alarm sign SAL, acoustic and/or visual, following reception of the alarm measurement datum φ2AL.

In reference to FIGS. 8A and 8C, a second alternative of the step of the third embodiment comprises:

the second detection terminal 9 transmits the measurement data φ2 at regular intervals, and each audio-digital communication terminal 8 analyzes these measurement data φ2 relative to an alarm threshold φ2sal that is specific to it so as to transmit an alarm signal SAL if the measurement data φ2 exceed that alert threshold φ2sal.

In other words, in this third alternative, the parameter measured by at least one of the internal 83 and/or external 90 sensors is transmitted raw and each audio-digital communication terminal 8 performs an analysis relative to its own alert threshold φ2sal, so as to be able to take the specificity of each user into account relative to that parameter.

To that end, and as shown in FIG. 8D, each audio-digital communication terminal 8 includes a comparison block 88 between the measurement data φ2 and the predefined alert threshold φ2sal. Furthermore, each audio-digital communication terminal 8 includes means for transmitting the alarm signal SAL, acoustic and/or visual, following the result of the comparison done by the comparison block 88.

Figure 9A:
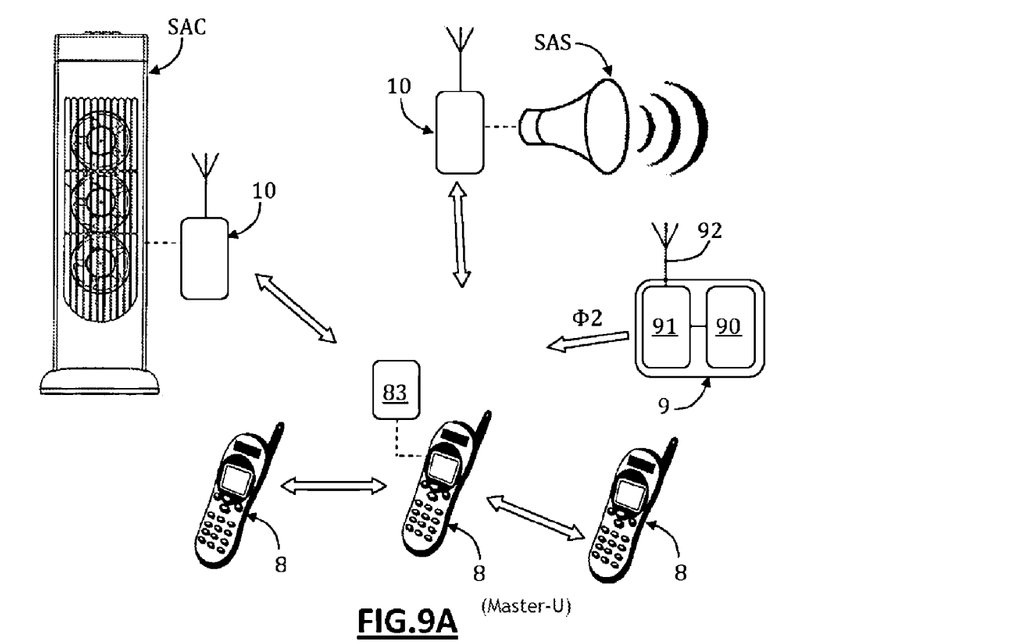

FIG. 9A shows a communication network comprising audio-digital communication terminals 8, an external detection terminal 9, and control terminals 10, 11 of a functional member implementing a fourth embodiment of the communication method according to the invention.

In this FIG. 9A, the network comprises:

three audio-digital communication terminals 8 associated with respective users and transmitting/receiving in particular audio-digital data "Audio" and measurement data, where one of the audio-digital communication terminals 8 integrates an onboard sensor 83 and is therefore able to transmit a first measurement datum $\phi1$, an external detection terminal 9 transmitting a second measurement datum $\phi2$, and two control terminals 10, 11 of a functional member 11, in this case a first control terminal 11 of an aeration and/or air conditioning system SAC and a second control terminal for a sound alarm system SAS.

Each control terminal 10, 11 is provided with a means for receiving data transmitted by the other terminals 8, 9 so as to actuate or not actuate the corresponding functional member SAC, SAS as a function of these received data. Compared to the network described above, this local network is completed by control terminals 10, 11 of functional members; these control terminals 10, 11 forming service or security actuators also reacting to the interpretation of the orders and physical measurements circulating on the network, such as for example valves, aeration systems, electric selectors, various motors, etc.

These control terminals 10, 11 constitute elements necessary for the operations and that can be remotely controlled, either automatically by the sensors 90, 93 (as a function of the measurement data $\phi1$, $\phi2$ circulating in the cycles), or manually via the interfaces of the audio-digital communication terminals 8 of the users (following the transmission of an order datum "order").

Figure 9B:
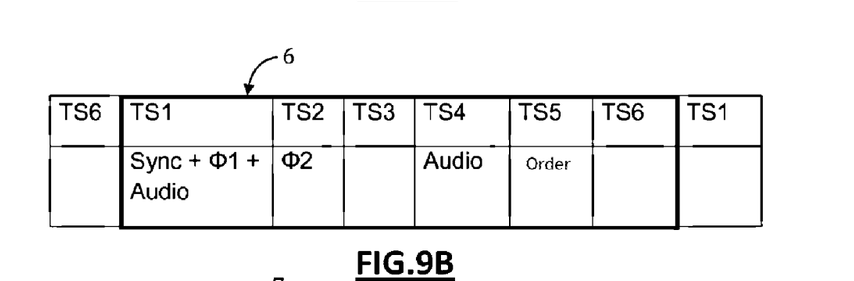
FIGS. 9B and 9C show two steps of the fourth embodiment of the communication method according to the invention, respectively showing a cycle of the communication channel, FIG. 10 diagrammatically illustrates a mixed data burst bringing together several categories of data, and FIG. 11 diagrammatically illustrates a communication network comprising audio-digital communication terminals, a detection terminal and a control terminal of a functional member, for implementing a fifth embodiment of the communication method according to the invention.

In reference to FIGS. 9A and 9B, the fourth embodiment comprises:

a first audio-digital communication terminal 8, here forming the master terminal Master-U and provided with an integrated sensor 83, communicates audio-digital data "Audio," a first measurement datum $\phi1$ and the synchronization signal Sync in the timeslot TS1 of cycle 6;

the detection terminal 9 communicates a second measurement datum $\phi2$ in timeslot TS2;

a second audio-digital communication terminal 8 communicates audio-digital data "Audio" in the timeslot TS4; and a third audio-digital communication terminal 8 communicates an order datum "order" in the timeslot TS5; and one of the control terminals 10, 11 actuates the functional member associated with it following the reception of the order datum "order."

This order datum "order" can be transmitted by an audio-digital communication terminal 8, as mentioned above, for example following reception of an alarm measurement datum $\phi2$AL described above, or following the user's wish.

In a first alternative, the order datum "order" can be transmitted directly by a detection terminal 9 when the associated parameter exceeds a predefined critical threshold. This first alternative comprises:

the detection terminal 9 transmits an order datum "order" (potentially in parallel with an alarm measurement datum $\phi2$AL) when the associated measurement datum $\phi2$ exceeds a predefined critical threshold $\phi2$scrit, and one of the order terminals 10, 11 actuates the operational member associated with it following reception of the order datum "order."

In a second alternative, the measurement datum $\phi2$ is transmitted raw and each control terminal 10, 11 performs an analysis relative to its own alert threshold $\phi2$sal, so as to be able to take the specificity of each functional member into account relative to the measured parameter. This second alternative comprises:

the detection terminal 9 transmits the measurement data $\phi2$ at regular time intervals, and the or each control terminal 10, 11 analyzes those measurement data $\phi2$ relative to an alert threshold $\phi2$sal specific to it so as to actuate the functional member associated with it if the measurement data $\phi2$ exceed said alert threshold $\phi2$sal.

In the approach described above in reference to FIG. 9B, the control terminals 10, 11 are simple receivers and, to that end, do not stress the local network by not transmitting any data.

Nevertheless, for an actual safety application, it is preferable for the control terminals 10, 11 to form completely separate communication points, so as to be able to acknowledge receipt of the received order and report on their proper action, or even indicate their failure to users.

Figure 9C:
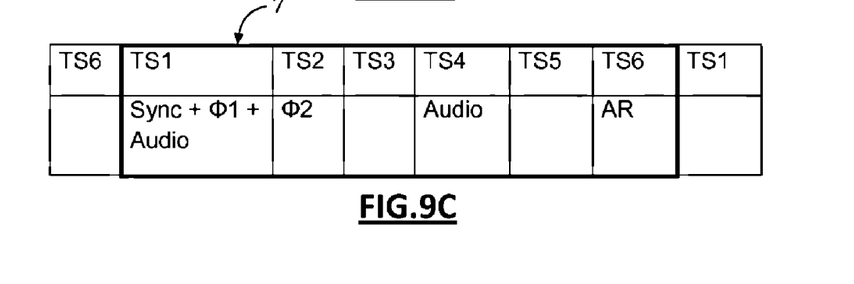

Thus, as illustrated in FIG. 9C, one of the control terminals 10, 11 communicates a reception datum AR in the cycle 7 following the cycle 6 mentioned above and visible in FIG. 9B, so as to acknowledge receipt of the order datum "order," and potentially indicate the actuation or non-actuation of the associated functional member.

In this fourth embodiment of the method, it is possible to consider the following functions:

a Geiger sensor can independently trigger an aspersion intended to catch any radioactive dust and cut the electric circuits then exposed;

a water level sensor can, faced with the increase in a stream of water, automatically trigger the stoppage of the cutting equipment of a hauling team situated along that stream of water so as to proceed with a risk-free evacuation;

a sensor for the passage of a train can activate signaling upstream of the railroad maintenance to signal to the train to blow its horn and slow down;

a toxicity or fire sensor can automatically trigger an alarm siren.

With these third and fourth embodiments, the number of data increases substantially within the local network and it becomes necessary to hierarchize the exchanges in order to leave bandwidth for safety-related messages.

In agreement with the priority mechanism described above, in reference in particular to FIGS. 4A to 5, it is possible to define priority levels, as below:

minimum or low priority level for the so-called service audio-digital data "Audio";

medium priority level for so-called service order data "order" and measurement data "$\phi$";

maximum or high priority level for so-called service alarm measurement data "$\phi2$AL" and/or measurement data "$\phi$" associated with critical parameters chosen beforehand, such as for example toxicity parameters or physiological parameters.

Thus, during exploitation, the low-priority data must give way to the higher priority data. Since all of the receivers see all of the traffic, it is possible for them to judge whether the priority of their communication gives them access to the channel, according to the priority mechanism described above.

Figure 11:
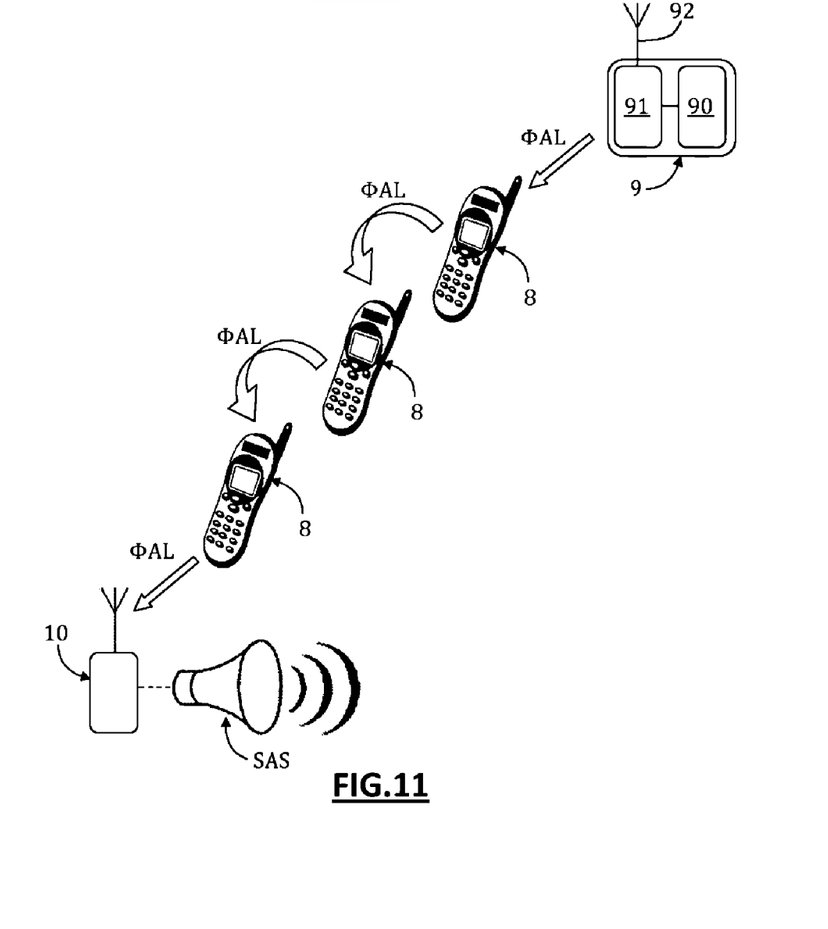

FIG. 11 shows a communication network comprising several audio-digital communication terminals 8, a detection terminal 9 and a control terminal 10 of a functional member, such as for example a sound alarm system SAS. This network illustrates the implementation of a fifth embodiment of the communication method according to the invention that consists of the audio-digital communication terminals relaying the measurement data "$\phi$" coming from the detection terminal 9 and intended for the control terminal 10; these audio-digital communication terminals 8 propagate those measurement data "$\phi$".

The propagation of the measurement data "φ" can of course be done by other detection terminals 9 and/or other control terminals 10, 11. The data propagated by these terminals 8, 9, 10, 11 can of course concern other data categories.

Thus, this fifth embodiment of the method makes it possible, during an intervention, to completely grid the area with a large number of communication points, whether they are user audio-digital communication terminals 8, detection terminals 9 or control terminals 10, 11. In terms of the conveyance of data within the network, these terminals 8, 9, 10, 11 all have the same possibilities.

To that end, it is entirely possible to use these various terminals 8, 9, 10, 11 no longer to broadcast information, but to propagate it in order to cover significant distances. If each of these terminals repeats the information, without necessarily interpreting or analyzing it, it becomes possible to greatly extend the local network.

In the example illustrated in FIG. 11, the audio-digital communication terminal 8 closest to the detection terminal 9 for example relays an alarm measurement datum "φAL" (of the same type as described above) coming from the detection terminal 9 (when a critical threshold is exceeded) intended for the control terminal 10, to ultimately trigger the sound alarm system SAS.

The propagation of the alarm datum "φAL" is done closer and closer until the terminal concerned by that datum is reached, here the control terminal 10; the audio-digital communication terminals 8 brought into play in this propagation can remain completely passive in light of their user, whether or not they are in communication when the alarm datum "φAL" is transmitted. To that end, it is possible for this alarm datum "φAL" to be transmitted with a specific signal that informs that only the control terminal 10 must take that datum into account, the audio-digital communication terminals 8 having to settle for retransmitting the alarm datum "φAL" with a view to propagation.

Of course, the examples of embodiments mentioned above are in no way limiting and other details and improvements can be made to the method according to the invention, without, however, going beyond the scope of the invention where other forms and/or categories of data and/or terminals can be considered.

The invention claimed is:

1. A communication method using time-division multiplexing between a master terminal and several slave terminals, comprising:
   a data transmission being done in successive cycles, each cycle being divided into a plurality of timeslots,
   one timeslot of each cycle being reserved for the master terminal to emit a synchronization signal, and
   each terminal either being in transmission mode or in listening mode, during each time interval,
   wherein, in listening mode, each slave terminal selects a free timeslot in a current cycle, and in transmission mode, emits, during at least one subsequent cycle, data in the selected timeslot, said selected slot becoming free as soon as the slave terminal stops transmitting,
   wherein the master terminal and some of the slave terminals are audio-digital communication terminals adapted for the transmission/reception of audio-digital data, the data exchanged between the terminals comprising this audio-digital data,
   wherein the slave terminals comprise one or more detection terminals for detecting a parameter of a type of physical, chemical, environmental, physiological or status, the one or more detection terminals comprising at least one sensor for measuring the parameter and means for transmitting measurement data taken by the corresponding sensor, the data exchanged between the terminals comprising that measurement data,
   wherein the one or more detection terminals transmit an alarm measurement datum on the timeslot selected during the listening mode in the previous cycle when the associated parameter exceeds a predefined critical threshold, and wherein at least one audio-digital communication terminal transmit an alarm signal after receiving the alarm measurement datum.

2. The method according to claim 1, wherein each slave terminal:
   assigns priority levels to the different free timeslots in a cycle,
   only selects a timeslot for transmission if the priority level of the slot is low enough, and
   assigns variable priority levels as a function of the number of free timeslots.

3. The method according to claim 2, wherein the priority level of the free timeslots increases as the number of free timeslots decreases.

4. The method according to claim 2, wherein a minimum-priority terminal forcibly frees, at its own initiative, the timeslot it occupies when a respective channel is saturated.

5. The method according to claim 1, further comprising a step for reserving a timeslot for a high-priority user terminal throughout a communication.

6. The method according to claim 5, wherein the master terminal is a high-priority user terminal.

7. The method according to claim 5, wherein each a slave terminal is a high-priority user terminal, and that slave terminal of a high-priority user type transmits, in the timeslot reserved for it, a synchronization signal different from that of the master.

8. The method according to claim 1, further comprising a step for dividing each free timeslot into sub-slots, each sub-slot being available for a different terminal.

9. The method according to claim 8, wherein the number of sub-slots per slot increases when the number of free timeslots decreases.

10. The method according to claim 1, further comprising a step for assigning priority levels according to categories of data comprising an audio-digital data category and a measurement data category.

11. The method according to claim 1, further comprising a step for assigning a higher priority level for the alarm measurement data than the priority level for the audio-digital data.

12. The method according to claim 1, wherein the one or more detection terminals transmit measurement data at regular time intervals, and each audio-digital communication terminal analyzes the measurement data relative to an alert threshold) specific to it so as to transmit an alarm signal if the measurement data exceed that alert threshold.

13. The method according to claim 1, wherein the slave terminals comprise one or more control terminals of a functional member provided with means for receiving data transmitted by the other terminals, so that the method comprises a step for transmitting an order datum and a step for actuating the functional member after reception of the order datum by the control terminal.

14. The method according to claim 13, wherein the order datum is transmitted by an audio-digital communication terminal.

15. The method according to claim 13, wherein the order datum is transmitted by a detection terminal when the associated parameter exceeds a predefined critical threshold.

16. The method according to claim 13, further comprising a step for transmitting a reception datum via the control terminal so as to acknowledge receipt of the order datum, and to indicate the actuation or non-actuation of the functional member.

17. The method according to claim 13, further comprising a step for assigning priority levels according to categories of data comprising an audio-digital category, a measurement data category, and an order data category.

18. The method according to claim 17, further comprising assigning a priority level for the alarm measurement datum higher than a priority level for the order datum.

19. The method according to claim 17, further comprising a step for assigning a priority level for the order datum higher than the priority level for the audio-digital data.

20. The method according to claim 1, wherein all or some of the audio-digital communication terminals relay the received data to the other terminals so as to propagate that data.

21. The method according to claim 1, wherein the detection terminal is associated with an audio-digital communication terminal within a device comprising onboard one or more sensors and radio communication means.

22. The method according to claim 1, wherein the detection terminal is isolated from the audio-digital communication terminals.

\* \* \* \* \*